Nov. 5, 1935.  A. PARTICELLI  2,020,202
CUT-OUT SWITCH
Filed Aug. 25, 1933    2 Sheets-Sheet 1
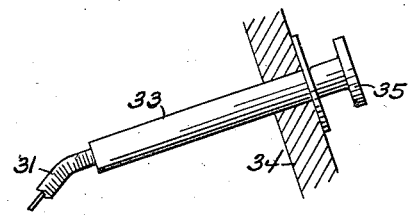
Fig.1.
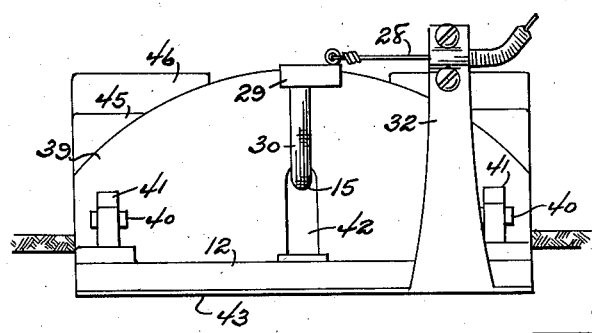
Fig.5.
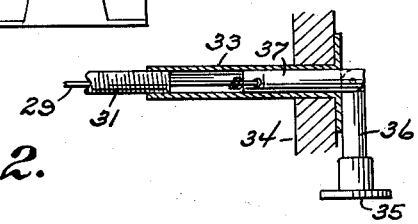
Fig.2.
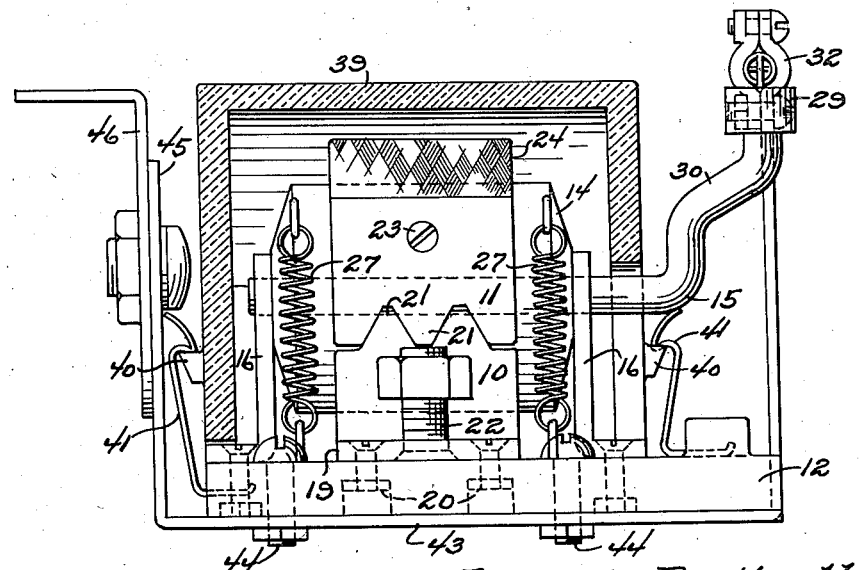
Augusto Particelli
INVENTOR
BY Victor J. Evans & Co.
ATTORNEY

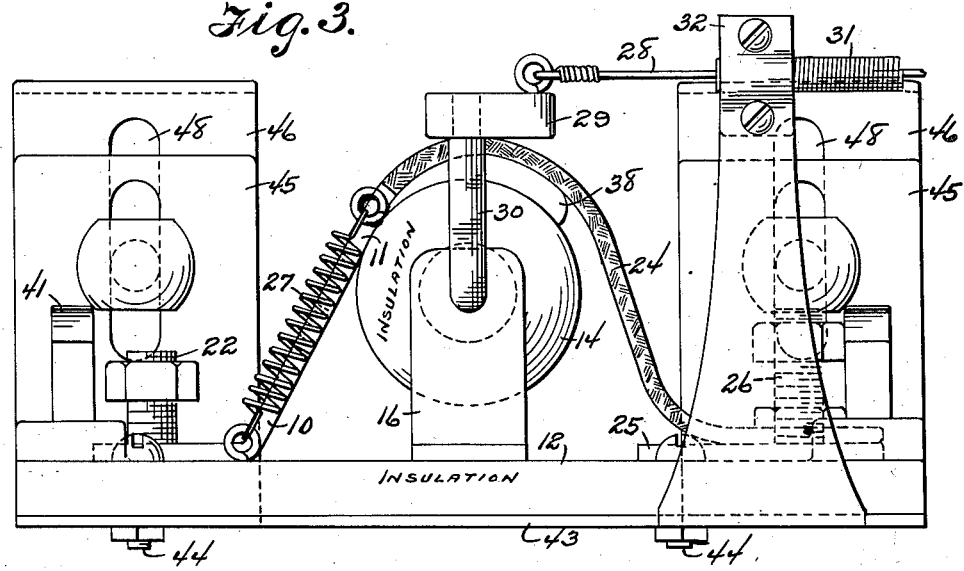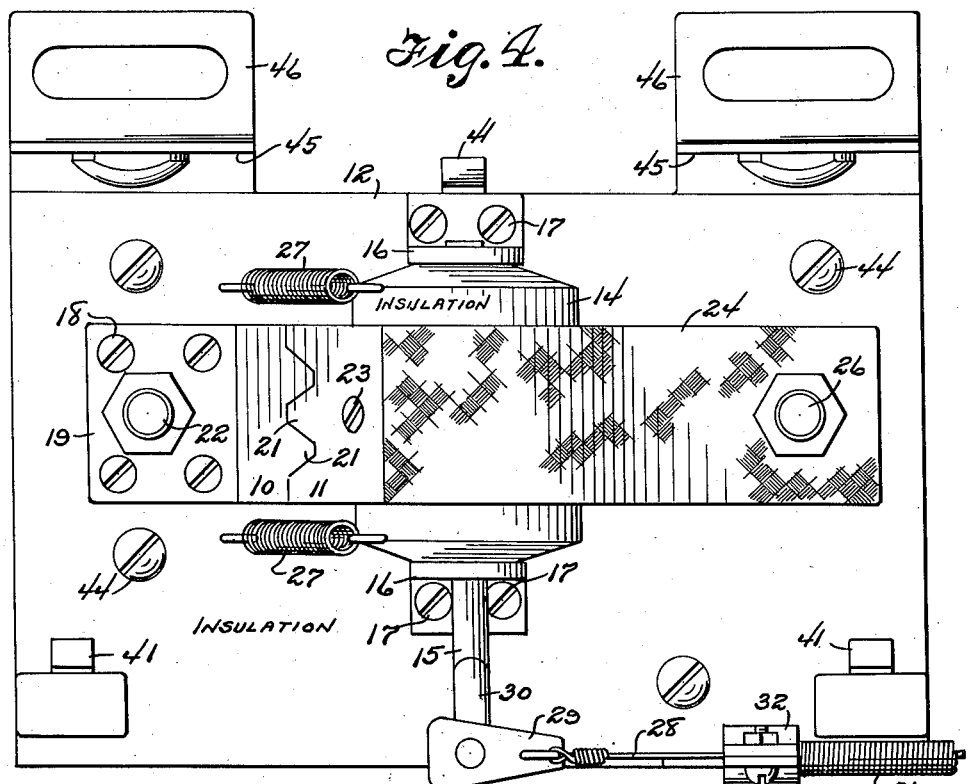

Patented Nov. 5, 1935

2,020,202

UNITED STATES PATENT OFFICE 2,020,202

CUT-OUT SWITCH

Augusto Particelli, Crumpler, W. Va.

Application August 25, 1933, Serial No. 686,818

1 Claim. (Cl. 200—161)

The object of the invention is to provide a cut-out switch particularly adapted for use in connection with motor vehicles as a means to be disposed adjacent to the storage battery of the latter but operated from the interior of the vehicle, so as to be operated to definitely break the circuit at the battery, thus serving to insure against fires at a time when the operator or owner of the vehicle is away from the same; to provide a switch of the kind indicated which may be readily applied to any conventional motor vehicle without modification thereof; and generally to provide a cut-out switch which, while of the heavy construction necessary to carry the heavy current of the battery in starting the vehicle motor, is of simple form and susceptible of cheap manufacture.

With this object in view, the invention consists in a construction and combination of parts of which a preferred embodiment is illustrated in the accompanying drawings but to which embodiment the invention is not to be restricted. Continued use in practice may dictate certain changes or alterations and the right is claimed to make any which fall within the scope of the annexed claim.

In the drawings:

Figure 1 is a side elevational view of a switch constructed in accordance with the invention.

Figure 2 is an end elevational view, the case or cover being shown in section.

Figure 3 is a side elevational view with the cover removed.

Figure 4 is a top plan view with the cover removed.

Figure 5 is a detail view of the pull knob and associated stem.

Frequently the electric circuits of a motor vehicle have high resistance shorts or grounds which, if the vehicle be left standing without attention, as when the operator may be away, will result in fires, whereas these might not result disastrously if an attendant is close at hand. To insure against any such condition resulting disastrously in a vehicle, the present invention is provided and consists of a heavy duty switch with fixed and movable contact members 10 and 11, made of material of high electric conductivity, one of these members being mounted on the base 12 and the other on the movable element 14 which consists of a drum carried on a shaft 15 journalled in brackets 16 which are mounted on the base. The brackets are preferably secured to the base by attaching screws 17, while the fixed contact member 10 is similarly secured by screws 18, these passing through a base plate 19 which is formed as an integral part of the contact 10 and engaging nuts 20 which are set in pockets in the under face of the base, formed by counterboring the holes through which the screws 18 pass.

The contacts 10 and 11 are electrically connected by bringing them into edge engagement, the mating edges of the two being formed with teeth 21 which are arranged intercurrently on the two members and which are of tapering form, so that the teeth on the one may be readily directed into the spaces between the teeth on the other.

The base plate 19 is provided with a binding post 22 by means of which connection with the ungrounded side of the battery may be effected by means of a heavy cable. The contact 11 is secured to the drum by means of a screw 23 and is formed as the terminal of a flexible conductor 24, the latter being a metallic strap-like member formed of woven wire strands. The flexible conductor 24 is terminally seated upon a base plate 25 secured to the base in the same manner as the base plate 19, this base plate 25 carrying a binding post 26 which extends through the conductor and with which the lead connecting the battery to the starting switch of the motor is connected.

The contact 11 is moved into engagement with the contact 10 through the instrumentality of tension springs 27 terminally anchored to the drum 14 at its periphery at opposite ends and similarly anchored to the base. Movement of the drum to disengage the contact 11 from the contact 10 is effected by the pull applied to a Bowden wire 28 which is terminally anchored to a clamp member 29 secured to a crank 30 with which the shaft 15 is provided and which stands in a vertical position, or a perpendicular position with respect to the base, when the contacts 10 and 11 are in engagement. The Bowden wire is disposed in a flexible tubular guide 31 of which one end is mounted in a supporting clamp 32 carried by the base and the other end is inserted in the extremity of a stiff tubular guide 33 mounted in the dash 34 of the vehicle on which the device is used. A pull knob 35 is terminally connected with the Bowden wire within the tube 33 and has a stem consisting of pivotally connected sections 36 and 37 of which the former is forked and the other is formed with a terminal extension lying between the legs of the fork, the pivotal connection being adjacent the extremities of the legs of the fork. When the pull knob is drawn out, therefore, the stem may be broken on the pivotal connection so as to dispose the terminal portion and connected extension transverse to the remaining part of the stem and will thus abut the front face of the dash and maintain the separated condition of the contact elements 10 and 11.

To prevent the flexible conductor 24 from bending down under the drum on the opening operation of the switch, the drum is provided with a bulge or enlargement 38 over which the conductor 24 extends.

To enclose the operating parts of the switch, there is provided a cover or housing 39 which is seated upon the base and whose side walls are provided with lugs 40 engageable with latch springs 41 carried by the base. The housing on that side where the crank 30 is disposed is provided with a clearance slot 42 for the shaft 15.

The base, which is of insulating material, is seated on a metallic plate 43 to which it is secured by the bolts 44, this plate being extended on one side of the base to provide the hanger arms 45 which are adjustably connected with the mounting brackets 46 by means of bolts 47 which pass through slots 48 in the mounting brackets in the hanger. The mounting brackets constitute the means for supporting the device from a vehicle body.

When the car which is equipped with the invention is in motion, the contacts 10 and 11 are in engagement, so that the battery circuit is established through them. When the car is brought to rest and the owner purposes leaving the same, a pull is applied to the Bowden wire 28 until the stem of the pull knob is in a position to be broken in front of the instrument board or dash 24, when the section 36 is swung to its right-angular position to maintain the pull on the Bowden wire. The battery circuit is then open by reason of the separation of the contacts 10 and 11, so that any short circuits or grounds which might exist on the system cannot bring about any disastrous results.

The invention having been described, what is claimed as new and useful is:

A cut-out switch comprising a base, a fixed contact rigidly mounted on the base, a binding post selectively connected with the fixed contact, a second binding post mounted on the base, a drum rotatably mounted on the base, a contact mounted on the periphery of the drum to be engaged with the fixed contact, a flexible conductor connecting the second said binding post with the drum carried contact, springs terminally anchored to the base and the drum at its periphery to normally effect engagement between said contacts, and a pull member having an operative connection with the drum to rock the latter in opposition to said spring.

AUGUSTO PARTICELLI.